(12) United States Patent
McNeff et al.

(10) Patent No.: US 8,017,796 B2
(45) Date of Patent: Sep. 13, 2011

(54) SYSTEMS FOR SELECTIVE REMOVAL OF CONTAMINANTS FROM A COMPOSITION AND METHODS OF REGENERATING THE SAME

(75) Inventors: Clayton V. McNeff, Andover, MN (US); Larry C. McNeff, Anoka, MN (US); Bingwen Yan, Shoreview, MN (US)

(73) Assignee: McNeff Research Consultants, Inc., Anoka, MN (US)

( * ) Notice: Subject to any disclaimer, the term of this patent is extended or adjusted under 35 U.S.C. 154(b) by 0 days.

(21) Appl. No.: 12/540,568

(22) Filed: Aug. 13, 2009

(65) Prior Publication Data

US 2010/0147771 A1   Jun. 17, 2010

Related U.S. Application Data

(63) Continuation-in-part of application No. 12/030,801, filed on Feb. 13, 2008.

(60) Provisional application No. 60/889,730, filed on Feb. 13, 2007, provisional application No. 60/945,083, filed on Jun. 19, 2007, provisional application No. 61/088,602, filed on Aug. 13, 2008.

(51) Int. Cl.
*C11B 3/10* (2006.01)

(52) U.S. Cl. ........ 554/193; 554/175; 554/191; 210/634; 210/660; 210/690; 208/263

(58) Field of Classification Search ............... 208/263; 210/690; 554/175, 178; 502/20
See application file for complete search history.

(56) References Cited

U.S. PATENT DOCUMENTS

| | | | |
|---|---|---|---|
| 2,383,632 A | 8/1945 | Trent | |
| 2,679,471 A | 5/1954 | Ayers et al. | |
| 3,383,396 A | 5/1968 | Cahn et al. | |
| 4,138,336 A | 2/1979 | Mendel et al. | |
| 4,216,337 A | 8/1980 | Baba et al. | |
| 4,487,933 A | 12/1984 | Mixan | |
| 4,582,589 A | 4/1986 | Ushizawa et al. | |
| 4,716,218 A | 12/1987 | Chen et al. | |
| 4,861,739 A | 8/1989 | Pellet et al. | |
| 5,108,597 A | 4/1992 | Funkenbusch et al. | |
| 5,179,219 A * | 1/1993 | Priegnitz | 554/193 |
| 5,182,016 A | 1/1993 | Funkenbusch et al. | |
| 5,252,762 A * | 10/1993 | Denton | 554/196 |
| 5,254,262 A | 10/1993 | Funkenbusch et al. | |
| 5,271,833 A | 12/1993 | Funkenbusch et al. | |
| 5,298,650 A | 3/1994 | Waller et al. | |
| 5,321,197 A | 6/1994 | Angstadt et al. | |
| 5,346,619 A | 9/1994 | Funkenbusch et al. | |
| 5,350,879 A | 9/1994 | Engel et al. | |
| 5,508,457 A | 4/1996 | Bayense et al. | |
| 5,532,392 A | 7/1996 | Gheorghiu | |
| 5,540,834 A | 7/1996 | Carr et al. | |
| 5,908,946 A | 6/1999 | Stern et al. | |
| 6,090,959 A | 7/2000 | Hirano et al. | |
| 6,211,390 B1 | 4/2001 | Peter et al. | |
| 6,376,701 B1 | 4/2002 | Chavan et al. | |
| 6,392,062 B1 | 5/2002 | Haas | |
| 6,433,146 B1 | 8/2002 | Cheryan | |
| 6,489,496 B2 | 12/2002 | Barnhorst et al. | |
| 6,538,146 B2 | 3/2003 | Turck | |
| 6,666,074 B2 | 12/2003 | Gerner et al. | |
| 6,712,867 B1 | 3/2004 | Boocock | |
| 6,719,815 B2 | 4/2004 | Nanninga et al. | |
| 6,768,015 B1 | 7/2004 | Luxem et al. | |
| 6,878,837 B2 | 4/2005 | Bournay et al. | |
| 6,887,283 B1 | 5/2005 | Ginosar et al. | |
| 6,960,672 B2 | 11/2005 | Nakayama et al. | |
| 6,963,004 B2 | 11/2005 | Ahtchi-Ali et al. | |
| 6,965,044 B1 | 11/2005 | Hammond et al. | |
| 6,979,426 B2 | 12/2005 | Teall et al. | |
| 6,982,340 B2 | 1/2006 | Mumura et al. | |
| 7,045,100 B2 | 5/2006 | Ergun et al. | |
| 7,097,770 B2 * | 8/2006 | Lysenko et al. | 210/660 |
| 7,112,688 B1 | 9/2006 | Tysinger et al. | |
| 7,145,026 B2 | 12/2006 | Fleisher | |
| 7,151,187 B2 | 12/2006 | Delfort et al. | |

(Continued)

FOREIGN PATENT DOCUMENTS

BR       8202429      11/1983

(Continued)

OTHER PUBLICATIONS

File History in co-pending U.S. Appl. No. 12/030,801, Entitled "Devices and Methods for Selective Removal of Contaminants from a Composition" (pp. 1-237).

(Continued)

*Primary Examiner* — Glenn A Caldarola
*Assistant Examiner* — Michelle L Stein
(74) *Attorney, Agent, or Firm* — Pauly, Devries Smith & Deffner, L.L.C.

(57) ABSTRACT

The present invention relates to devices and methods for selectively removing contaminants from a crude product mixture. In an embodiment the invention includes a method for removing organic acids from a crude product mixture including contacting the crude product mixture with a metal oxide substrate, wherein free organic acids in the crude product mixture bind to the metal oxide substrate, thereby removing free organic acids and forming a refined product mixture; separating the refined product mixture from the metal oxide substrate; and removing the organic acids bound to the metal oxide substrate by contacting the metal oxide substrate with an alkyl ester composition at a temperature of greater than about 100 degrees Celsius. Other embodiments are also described herein.

17 Claims, 10 Drawing Sheets

U.S. PATENT DOCUMENTS

| | | |
|---|---|---|
| 7,211,681 B2 | 5/2007 | Furuta |
| 7,321,052 B2 | 1/2008 | Miller et al. |
| 7,498,454 B2 | 3/2009 | Redlingshoefer |
| 7,563,915 B2 | 7/2009 | Matson |
| 7,582,784 B2 | 9/2009 | Banavali et al. |
| 7,601,858 B2 | 10/2009 | Cantrell et al. |
| 7,790,651 B2 | 9/2010 | Lin |
| 7,897,798 B2 | 3/2011 | McNeff |
| 2002/0010359 A1 | 1/2002 | Kaita et al. |
| 2002/0156305 A1 | 10/2002 | Turck |
| 2003/0229238 A1 | 12/2003 | Fleisher |
| 2004/0074760 A1 | 4/2004 | Portnoff et al. |
| 2004/0087809 A1 | 5/2004 | Nakayama et al. |
| 2004/0094477 A1 | 5/2004 | Lysenko et al. |
| 2005/0064577 A1 | 3/2005 | Berzin |
| 2005/0080280 A1 | 4/2005 | Yoo |
| 2005/0118409 A1 | 6/2005 | McNeff et al. |
| 2005/0137411 A1 | 6/2005 | Ahtchi-Ali et al. |
| 2005/0204612 A1 | 9/2005 | Connemann et al. |
| 2005/0239182 A1 | 10/2005 | Berzin |
| 2005/0260553 A1 | 11/2005 | Berzin |
| 2005/0261509 A1 | 11/2005 | Delfort et al. |
| 2005/0266139 A1 | 12/2005 | Lacome et al. |
| 2005/0274065 A1 | 12/2005 | Portnoff et al. |
| 2006/0014974 A1 | 1/2006 | Bournay et al. |
| 2006/0041152 A1 | 2/2006 | Cantrell et al. |
| 2006/0041153 A1 | 2/2006 | Cantrell et al. |
| 2006/0080891 A1 | 4/2006 | Ghosh et al. |
| 2006/0149087 A1 | 7/2006 | Furuta |
| 2006/0224005 A1 | 10/2006 | Felly |
| 2006/0252950 A1 | 11/2006 | Ginosar et al. |
| 2006/0260186 A1 | 11/2006 | Iversen et al. |
| 2006/0288636 A1 | 12/2006 | Iijima et al. |
| 2007/0010682 A1 | 1/2007 | Myllyoja et al. |
| 2007/0027338 A1 | 2/2007 | Furuta |
| 2007/0037994 A1 | 2/2007 | Canos et al. |
| 2007/0066838 A1 | 3/2007 | Hillion et al. |
| 2007/0089356 A1 | 4/2007 | Krasutsky et al. |
| 2007/0093380 A1 | 4/2007 | Srinivas et al. |
| 2007/0196892 A1 | 8/2007 | Winsness et al. |
| 2007/0283619 A1 | 12/2007 | Hillion et al. |
| 2008/0161615 A1 | 7/2008 | Chapus |
| 2008/0188676 A1 | 8/2008 | Anderson et al. |
| 2008/0197052 A1 | 8/2008 | McNeff et al. |
| 2008/0318763 A1 | 12/2008 | Anderson |
| 2009/0029445 A1 | 1/2009 | Eckelberry et al. |
| 2010/0087670 A1 | 4/2010 | Wang et al. |
| 2010/0170143 A1 | 7/2010 | Mcneff et al. |
| 2010/0170147 A1 | 7/2010 | McNeff et al. |
| 2010/0191004 A1 | 7/2010 | McNeff et al. |

FOREIGN PATENT DOCUMENTS

| | | |
|---|---|---|
| CN | 1680514 | 10/2005 |
| CN | 1718679 | 1/2006 |
| CN | 1858160 | 11/2006 |
| CN | 1887417 | 1/2007 |
| CN | 1928016 | 3/2007 |
| DE | 102005038137 | 2/2007 |
| EP | 0198243 | 10/1986 |
| EP | 0507217 | 10/1992 |
| EP | 0535290 | 4/1993 |
| EP | 1505048 | 2/2005 |
| EP | 1580255 | 9/2005 |
| EP | 1607467 | 12/2005 |
| EP | 1681281 | 7/2006 |
| FR | 2188612 | 1/1974 |
| FR | 2679471 | 1/1993 |
| FR | 2890656 | 3/2007 |
| GB | 2132222 | 7/1984 |
| JP | 6313188 | 11/1994 |
| JP | 11228494 | 8/1999 |
| JP | 2005126346 | 5/2005 |
| JP | 2005177722 | 7/2005 |
| JP | 2007153944 | 6/2007 |
| JP | 2007190450 | 8/2007 |
| JP | 2008111085 | 5/2008 |
| WO | WO-0005327 | 2/2000 |
| WO | WO-03/062358 | 7/2003 |
| WO | WO-03/087279 | 10/2003 |
| WO | WO-03094598 | 11/2003 |
| WO | WO-2004/085585 | 10/2004 |
| WO | WO-2004096962 | 11/2004 |
| WO | WO-2005/000782 | 1/2005 |
| WO | WO-2005021697 | 3/2005 |
| WO | WO-2005/035479 | 4/2005 |
| WO | WO-2005/093015 | 10/2005 |
| WO | WO-2005/123890 | 12/2005 |
| WO | WO-2006/070661 | 7/2006 |
| WO | WO-2006/081644 | 8/2006 |
| WO | WO-2006/088254 | 8/2006 |
| WO | WO-2006/093896 | 9/2006 |
| WO | WO-2006/094986 | 9/2006 |
| WO | WO-2007/011343 | 1/2007 |
| WO | WO-2007/012190 | 2/2007 |
| WO | WO-2007/025360 | 3/2007 |
| WO | WO-2007/029851 | 3/2007 |
| WO | WO-2007/038605 | 4/2007 |
| WO | WO-2007/043062 | 4/2007 |
| WO | WO-2007072972 | 6/2007 |
| WO | WO-2007077950 | 7/2007 |
| WO | WO-2007111604 | 10/2007 |
| WO | WO-2007140395 | 12/2007 |
| WO | WO-2007141293 | 12/2007 |
| WO | WO-2007142983 | 12/2007 |
| WO | WO-2008012275 | 1/2008 |
| WO | WO-2008019325 | 2/2008 |
| WO | WO-2008/034109 | 3/2008 |
| WO | WO-2008029132 | 3/2008 |
| WO | WO-2008041038 | 4/2008 |
| WO | WO-2008101032 | 8/2008 |
| WO | WO-2009002880 A1 | 12/2008 |
| WO | WO-2009007234 A1 | 1/2009 |
| WO | WO-2010144597 | 12/2010 |

OTHER PUBLICATIONS

*International Search Report and Written Opinion from International* Application No. PCT/US2008/053883, mailed Jul. 9, 2008 (pp. 1-13).

*PCT International Search Report and Written Opinion from International* Application No. PCT/US2007/075211, mailed Jul. 9, 2008 (pp. 1-14).

"EP Communication, EPO form 2906 01.91TRI, from the European Patent Office in EP Patent Application No. 07840692.3, corresponding to U.S. Appl. No. 11/833,839, mailed Dec. 11, 2009, (pp. 1-4)".

"EP Communication, EPO form 2906 01.91TRI, from the European Patent Office in EP Patent Application No. 08729792.5, corresponding to U.S. Appl. No. 12/030,801, mailed Mar. 2, 2010, (pp. 1-4)".

"File History for co-pending U.S. Appl. No. 12/238,750, "Methods and Compositions for Refining Lipid Feed Stocks," (168 pages)".

"Kyte Centrifuge Sales & Consulting", www.kcentrifuge.com , p. 1.

"PCT International Search Report and Written Opinion from International Application No. PCT/US2010/038000, corresponding to U.S. Appl. No. 12/797,393, mailed Oct. 4, 2010, pp. 1-13".

"PCT Notification Concerning Transmittal of International Preliminary Report on Patentability", From International Application No. PCT/US2007075211, corresponding to U.S. Appl. No. 11/833,839, mailed Feb. 19, 2009, pp. 1-19.

"PCT Notification Concerning Transmittal of International Preliminary Report on Patentability", From International Application No. PCT/US2008053883, corresponding to U.S. Appl. No. 12/030,801, mailed Aug. 27, 2009, pp. 1-9.

"Response to European Communication pursuant to Article 94 (3) EPC, dated Dec. 11, 2009, Filed in the European Patent Office on Jun. 16, 2009 for EP Patent Application No. 07840692.3, corresponding to U.S. Appl. No. 11/833,839, (1-12)".

Annen, et al., "Development of Porous Zirconia Spheres by Polymerization-Induced Colloid Aggregation-Effect of Polymerization Rate", *Journal of Mater. Sci.*, 29(23):6123-6130 (1994).

Anon, , "Beatrice Biodiesel Selects Axens Exterfip-H Technology", *Biodiesel Magazine* Jun. 2006 , Unknown.

BCC Research, , "Global Market for Catalyst Regeneration", MarketResearch.com http://www.marketresearch.com/product/display.asp?productid=1354464 2006 , 1-20.

Blackwell, J. A. et al., "A Chromatographic Study of the Lewis Acid-Base Chemistry of Zirconia Surfaces", *J. Liquid Chromatog.* 1991, 14: 2875-2889.

Blackwell, J. A. et al., "Study of the Fluoride Adsorption Characterisitics of Porous Microparticulate Zirconium Oxide", *J. Chromatog*, 1991, 549: 43-57.

Bournay, L. et al., "New Heterogeneous Process for Biodiesel Production: A Way to Improve the Quality and the Value of the Crude Glycerin Produced by Biodiesel Plants", *Catalysis Today* 2005, 106: 190-192.

Brown, Adrian S. et al., "Sulfated Metal Oxide Catalysts: Superactivity through Superacidity?", *Green Chemistry* Feb. 1999, 17-20.

Bryan, Tom, "Adsorbing It All", *Biodiesel Magazine* Mar. 2005, 40-43.

Cao, W. et al., "Preparation of Biodiesel from Soybean Oil Using Supercritical Methanol and Co-Solvent", *Fuel* 2005, 84: 347-351.

Collins, K., "Statement of Keith Collins, Chief Economist, U.S. Department of Agriculture before the U.S. Senate Committee on Appropriations, Subcommittee on Agriculture, Rural Development, and Related Agencies: Economic Issues Related to Biofuels.", *Unknown* www.usda.gov/documents/Farmbill07energy.doc. Aug. 26, 2006, 1-8 (web).

Dean, Morgan et al., "Nanocrystalline Metal Oxide-Based Catalysts for Biodiesel Production from Soybean Oil", *#96—Student Poster Session: Catalysis & Reaction Engineering* (04016) http://aiche.confex.com/aiche/2006/techprogram/P78366.HTM Nov. 13, 2006, 1 (web).

Demirbas, Ayhan, "Biodiesel fuels from vegetable oils via catalytic and non-catalytic supercritical alcohol transesterifications and other methods: a survey", *Energy Conversion & Management* 2003, issue 44 pp. 2093-2109.

Di Serio, et al., "Synthesis of Biodiesel via Homogeneous Lewis Acid Catalyst", *J. Molec. Catal. A Chem.* 2005, 239: 111-115.

Di Serio, M. et al., "Transesterification of Soybean Oil to Biodiesel by Using Heterogeneous Basic Catalysts", *Ind. Eng. Chem. Res.* 2006, 45: 3009-3014.

Dorsa, Renato et al., "Basics of Alkali Refining of Vegetable Oils", *GEA Westfalia Separator Food Tec GmbH* Unknown, 1-28.

Dunlap, C. J. et al., "Zirconia Stationary Phases for Extreme Separations", *Anal. Chem.* 2001, 73: 598A-607A.

Elliott, Brian, "Low-cost Biodiesel Production Process Using Waste Oils and Fats", *U.S. EPA SBIR Phase I Kick-Off Meeting* www.iastate.edu/Inside/2003/0613/biorenewable.jpg Apr. 5, 2007, 1.

Fabbri, D. et al., ""Dimethyl carbonate as a novel methylating reagent for fatty acids in analytical pyrolysis"", *Journal of Chromatography, Elsevier Science Publishers B.V, NL LNKDDOI:* 10.I016/J.Chroma.2004.12.077 Feb. 18, 2005.

Furuta, S. et al., "Biodiesel Fuel Production with Solid Superacid Catalysis is Fixed Bed Reactor Under Atmospheric Pressure", *Catalysis Communications* 2004, 5: 721-723.

Gercel, H. F. et al., "Hydropyrolysis of Extracted Euphorbia rigida in a Well-Swept Fixed-Bed Tubular Reactor", *Energy Sources* 2002, 24: 423-430.

Goering, C. E. et al., "Fuel Properties of Eleven Vegetable Oils", *Trans ASAE* 1982, 25: 1472-1477.

Goodwin, J. G., "Research Activities: Biodiesel Synthesis", *Chemical and Biomolecular Engineering at Clemson University* http://www.ces.clemson.edu/chemeng/facultypages/goodwin/research.html 2006, 1-5.

Haas, M. J. et al., "Engine Performance of Biodiesel Fuel Prepared from Soybean Soapstack: A High Quality Renewable Fuel Produced from a Waste Feedstock", *Energy Fuels* 2001, 15: 1207-1212.

Haas, M. J. et al., "Improving the Economics of Biodiesel Production Through the Use of Low Value Lipids as Feedstocks: Vegetable Oil soapstock", *Fuel Process. Technol.* 2005, 86: 1087-1096.

Harvey, A. P. et al., "Process Intensification of Biodiesel Production Using a Continuous Oscillatory Flow Reactor", *J. Chem. Technol. Biotechnol.* 2003, 78: 338-341.

He, Chen et al., "Biodiesel from Transesterification of Cotton Seed Oil by Solid Bases Catalysis", *Journal of Chemical Engineering of Chinese Universities* Aug. 2006, No. 4 vol. 20.

He, Chen et al., "Biodiesel Production by the transesterification of cottonseed oil by solid acid catalysts", *Frontiers of Chemical Engineering in China* Feb. 2006, vol. 1, No. 1, pp. 1673-7369.

Henry, R. A. et al., "A Novel Chemical Route to Stable, Regenerable Zirconia-Based Chiral Stationary Phases for HPLC", *American Laboratory (News Edition)*. 2005, 37: 22-24.

Hill, J. et al., "Environmental, Economic, and Energetic Costs and Benefits of Biodiesel and Ethanol Biofuels", *PNAS* 2006, 103(30): 11206-11210.

Iijima, Wataru et al., ""Winterized" Bio-Diesel Fuel Produced from Animal Fat", *Agro-Energy Laboratory, Dept. of Farm Mechanization and Engineering, National Agricultural ResearchCentre, National Agricultural Research Organization*, Japan Unknown, 1-2.

Iijima, Wataru et al., "The Non-glycerol Process of Biodiesel Fuel Treated in Supercritical Methanol (Abstract)", Paper No. 046073, *2004 ASAE Annual Meeting* 2004, 1.

Ishihara, K. et al., "Direct Ester Condensation from a 1:1 Mixture of Carboxylic Acids and Alcohols Catalyzed by Hafnium (IV) or Zirconium (IV) Salts.", *Tetrahedron* 2002, 58: 8179-8188.

Kahn, A., "Research into Biodiesel Catalyst Screening and Development", *Thesis, University of Queensland Brisbane* 2002, 1-41.

Kiss, Anton A. et al., "Solid Acid Catalysts for Biodiesel Production—Towards Sustainable Energy", *Adv. Synth. Catal.* 2006, 348: 75-81.

Knothe, G., "Analytical Methods Used in the Production and Fuel Quality Assessment of Biodiesel", *Transactions of the ASAE* 2001, 44(2): 193-200.

Knothe, Gerhard et al., "Bidiesel: The Use of Vegetable Oils and Their Derivatives as Alternative Diesel Fuels", *Oil Chemical Research, National Center For Agricultural Utilization Research, Agricultural Research Service, U.S. Department of Agriculture*, Peoria, IL 61604 Unknown, 1-36.

Koh, Ashley D., "Non-Catalytic Biodiesel Production from Soybean Oil Using Supercritical Methanol", *The 2006 Annual Meeting San Francisco, CA* http://aiche.confex.com/aiche/2006/techprogram/P69978.HTM presented Nov. 15, 2006, 1.

Kulkarni, Mangesh G. et al., "Solid Acid Catalyxed Biodiesel Production by Simultaneous Esterification and Transesterification", *Green Chem.* 2006, 8: 1056-1062.

Kulkarni, M. et al., "Waste Cooking Oil: An Economical Source for Biodiesel", *Ind. Eng. Chem. Res.* 2006, 45: 2901-2913.

Liu, Yijun et al., "Transesterification of Poultry Fat with Methanol Using Mg-Al Hydrotalcite Derived Catalysts", *Applied Catalysis A: General* (Abstract only). 2007, vol. 331, 138-148.

Lopez, Dora E. et al., "Esterification and transesterification on tungstated zirconia: Effect of calcination temperature", *Journal or Catalysis* Apr. 1, 2007, vol. 247, Iss. 1, 43-50.

Lopez, D.E. et al., "Transesterification of Triacetin with Methanol on Solid Acid and Base Catalysts", *Appl. Catalysis A: General* 2005, 295: 97-105.

Lotero, E. et al., "Synthesis of Biodiesel Via Acid Catalysis", *Ind. Eng. Chem. Res.* 2005, 44:5353-5363.

Ma, R et al., "Biodiesel Production: A Review", *Bioresource Technol.* 1999, 70:1-15.

Miller, Dennis J. et al., "Catalysis for Biorenewables Conversion", *National Science Foundation Workshop Report* www.egr.msu.edu/apps/nsfworkshop Apr. 13, 2004, 1-63 (web).

Mittelbach, Martin et al., "Diesel Fuel Derived from Vegetable Oils, III. Emission Tests Using Methyl Esters of Used Frying Oil", *JAOCS* Jul. 1988, vol. 65, No. 7, 1185-1187.

Nawrocki, J. et al., "Chemistry of Zirconia and Its Use in Chromatography", *J. Chromatog.* 1993, A 657: 229-282.

Omota, F. et al., "Fatty Acid Esterification by Reactive Distillation: Part 2—Kinetics-based Design for Sulphated Zirconia Catalysts", *Chemical Engineering Science* 2003, 58: 3175-3185.

Ondrey, G., "Biodiesel Production Using a Heterogeneous Catalyst", *Chemical Engineering* 2004, 111(11):13.

Otera, J., "Transesterification", *Chem. Rev.* 1993, 93:1449-1470.

Peterson, C. L. et al., "Continuous Flow Biodiesel Production", *Appl. Eng. Agricul.* 2002, 18: 5-11.

Pinto, A. C. et al., "Biodiesel: An Overview", *J. Braz. Chem. Soc.* 2005, 16: 1313-1330.

Pruszko, R., "Strategic Biodiesel Decisions", *Iowa State University—University Extension* CIRAS 2006, 1-32.

Raddi De Araujo, Lucia R. et al., "H3PO4/Al2O3 Catatysts: Characterization and Catalytic Evaluation of Oleic Acid Conversion to Biofuels and Biolubricant", *Materials Research* 2006, vol. 9, No. 2, 181-184.

Reisch, Marc S., "Start-up Firms Pursue Biofuels", *Chemical & Engineering News* Nov. 20, 2006, vol. 84, No. 47, 1-2(web).

Rigney, M. P. et al., "Physical and Chemical Characterization of Microporous Zirconia", *J. Chromatog* 1990, 499: 291-304.

Robichaud, Michael J. et al., "An Improved Oil Emulsion Synthesis Method for Large, Porous Zirconia Particles for Packed- or Fluidized-Bed Protein Chromatography", *Separation Science and Technology* 1997, 32(15), pp. 2547-2559.

Schuchardt, Ulf et al., "Transesterification of Vegetable Oils: a Review", *J. Braz. Chem. Soc.* 1998, vol. 9, No. 1, 199-210.

Silva, Lisa et al., "Colorado Diesel School Bus Retrofit Program", *A Cooperative Effort of the Regional Air Quality Council and the Colorado Department of Public Health and Environment* 2006, 1-17.

Suppes, G. J. et al., "Transesterification of Soybean Oil with Zeolite and Metal Catalysts", *Applied Catalysis A: General* 2004, 257: 213-223.

Suwannakarn, Kaewta et al., "A comparative study of gas phase esterification on solid acid catalysts", *Catalysis Letters* Apr. 2007, vol. 114, Nos. 3-4, 1-7.

Tyson, K. S., "Brown Grease Feedstocks for Biodiesel", *National Renewable Energy Laboratory* Jun. 19, 2002, 1-34.

Unknown,, "AMBERLITEtm FP Ion Exchange Resins", *Amberlite FP technical bulletin* http://www.advancedbiosciences.com Dec. 2004, 1-7.

Unknown, et al., "Oak Ridge lab develops materials for biodiesel catalysis", *Biodiesel Magazine* http://biodieselmagazine.com/article-print.jsp?article_id=1580 2007, 1.

Unknown, "Standard Test Method for Acid Number of Petroleum Products by Potentiometric Titration", *ASTM International, Designation: D664-04* Mar. 2004, 1-7.

Verkade, J. G. et al., "Nanoporous Solid Catalysts for Conversion of Soybean Oil to Biodiesel", *Center for Catalysis, Iowa State University* http://www.iprt.iastate.edu/ccat/nano.html Feb. 22, 2006, 1-4.

Vieitez, Ignacio et al., "Continuous Production of Soybean Biodiesel in Supercritical Ethanol-Water Mixtures", *American Chemical Society, Energy & Fuels* Jun. 17, 2008, pp. 1-5.

Xie, W. et al., "Synthesis of Biodiesel from Soybean Oil Using Heterogeneous KF/ZnO Catalyst", *Catalyst Letters* Feb. 2006, 107: 53-59.

Yokoyama, Shin-Ya et al., "Liquid Fuel Production from Ethanol Fermentation Stillage", *Chemistry Letters* 1986, pp. 649-652.

Zhang, P., "A New Process for Biodiesel Production Based on Waste Cooking Oils and Heterogeneous Catalysts", *USDA-SBIR Agreement* #2005-33610-15497 2005, 1-2.

* cited by examiner

SYSTEMS FOR SELECTIVE REMOVAL OF CONTAMINANTS FROM A COMPOSITION AND METHODS OF REGENERATING THE SAME

This application is a continuation-in-part application of U.S. patent application Ser. No. 12/030,801, filed Feb. 13, 2008, which claims the benefit of U.S. Provisional Application No. 60/889,730, filed Feb. 13, 2007, and U.S. Provisional Application No. 60/945,083, filed Jun. 19, 2007, the content of all of which is herein incorporated by reference in its entirety. This application also claims the benefit of U.S. Provisional Application No. 61/088,602, filed Aug. 13, 2008, the content of which is herein incorporated by reference in its entirety.

FIELD OF THE INVENTION

The present invention relates to systems for the selective removal of contaminants from a composition. More specifically, the present invention relates to methods for regenerating systems used for the selective removal of contaminants from a composition.

BACKGROUND OF THE INVENTION

Many commercial production operations involve processing steps directed to the removal of byproducts or contaminants from a product mixture. An example of this occurs in the commercial process for producing soybean oil.

Soybean oil is usually produced through either a mechanical pressing process or a solvent extraction process. Various preparative steps can occur in the process including cleaning, drying and dehulling of the soybeans. After the soybeans are prepared, they can be heated in order to coagulate the soy proteins to make the oil extraction process easier. In the solvent extraction process, the soybeans are then cut into flakes which are put in percolation extractors and immersed in a solvent, such as hexane. The soybean oil is solvated by the solvent and then separated from the flakes. The solvent is then separated from the soybean oil, such as with an evaporator. The solvent free crude soybean oil is then further purified (refined). In the mechanical pressing process, the soybeans are typically crushed and pressed to yield a crude soybean oil which is then further purified.

Purification steps in both mechanical pressing processes and solvent extraction processes can include degumming (removing of phosphatides), alkali refining (washing with alkaline solution to remove free fatty acids, colorants, insoluble matter and gums) and bleaching (with activated earth or activated carbon to remove color and other impurities). The alkali refining process (sometimes referred to as caustic refining) is frequently carried out by mixing a strong base, such as sodium hydroxide, into an aqueous solution and then combining the aqueous solution and the crude soybean oil and agitating the mixture. Free fatty acids in the crude soybean oil react (saponification) with the strong base to form a soap composition which is soluble in the aqueous phase and mostly insoluble in the oil phase. The aqueous phase is then removed from the soybean oil carrying away the soap composition.

Alkali refining processes are effective for the removal of free fatty acids, but suffer from various disadvantages. First, alkali refining processes generally require the handling of very caustic strong bases, such as sodium hydroxide, creating safety issues and causing significant wear on equipment. Second, such strong bases can be relatively expensive to use.

It will be appreciated that removal of free fatty acids is a process step that is part of many other industrial production processes. By way of example, biodiesel fuel is produced through a transesterification process that converts triglycerides into fatty acid alkyl esters. This process is frequently carried out with either a strong base or strong acid. In the context of the transesterification process processed with a strong base, the fatty acids react with the strong base to form a soap composition. Unfortunately, significant amounts of fatty acids are frequently present in biological feed stocks used to make biodiesel. As such, even after the transesterification reaction takes place, there can sometimes still be significant amounts of fatty acids present in the product mixture. However, guidelines for biodiesel fuel place strict limits on the concentration of fatty acids that can be present. As such, fatty acids need to be removed from biodiesel fuel made from certain types of feedstocks.

SUMMARY OF THE INVENTION

The present invention relates to methods for regenerating systems used for removal of contaminants from a composition. In an embodiment the invention includes a method for removing organic acids from a crude product mixture including contacting the crude product mixture with a metal oxide substrate, wherein free organic acids in the crude product mixture bind to the metal oxide substrate, thereby removing free organic acids and forming a refined product mixture; separating the refined product mixture from the metal oxide substrate; and removing the organic acids bound to the metal oxide substrate by contacting the metal oxide substrate with an alkyl ester composition at a temperature of greater than about 100 degrees Celsius.

In an embodiment the invention includes a method of regenerating a free fatty acid removal apparatus including contacting saturated metal oxides disposed within the free fatty acid removal apparatus with a fatty acid alkyl ester composition at a temperature of greater than about 100 degrees Celsius, thereby releasing bound fatty acids from saturated metal oxides into the fatty acid alkyl ester composition.

In an embodiment the invention includes a system for producing a refined oil product including a production reactor for producing a crude oil product mixture, the reactor comprising a lipid reservoir, and an alcohol reservoir; and an organic acid removal reactor in fluid communication with the production reactor, the organic acid removal reactor comprising a housing defining an interior volume, the housing configured to receive the crude oil product mixture from the production reactor, metal oxide media disposed within the interior volume of the removal reactor housing, the metal oxide media comprising a metal oxide selected from the group consisting of zirconia, alumina, hafnia, and titania; the system configured to periodically regenerate the metal oxide media of the organic acid removal reactor by contacting the metal oxide media with a fatty acid alkyl ester composition at a temperature of greater than about 100 degrees Celsius.

The above summary of the present invention is not intended to describe each discussed embodiment of the present invention. This is the purpose of the figures and the detailed description that follows.

BRIEF DESCRIPTION OF THE FIGURES

The invention may be more completely understood in connection with the following drawings, in which.

Figure 1:
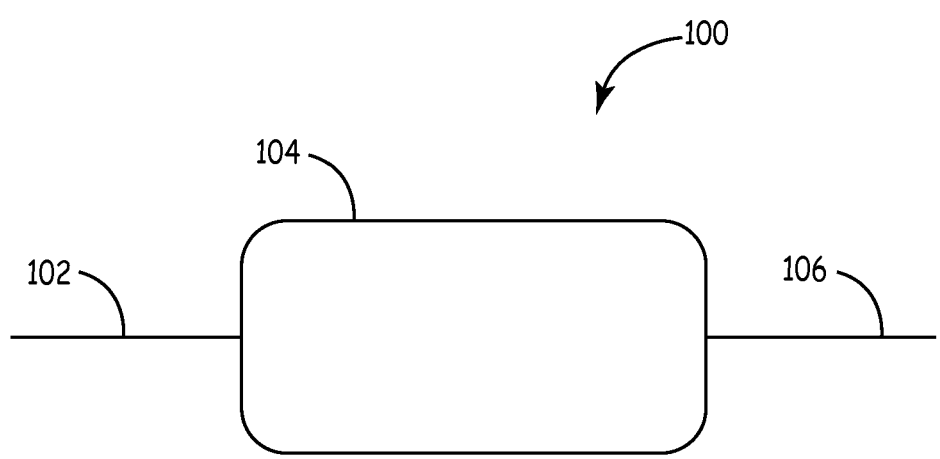
FIG. 1 is a block diagram of a contaminant removal device in accordance with an embodiment of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As described above, the removal of contaminants, such as organic acids (including fatty acids), from chemical compositions is an important commercial process. As shown herein, metal oxide media containing acid/base surface properties such as Lewis acid sites, Bronsted base sites, and/or Bronsted acid sites can be used to selectively bind contaminants from mixed chemical compositions. After the contaminants are bound to the metal oxide, the purified chemical composition can be separated out, leaving behind the metal oxide media and bound contaminants, such as organic acids.

Periodically the metal oxide media must be regenerated. That is, the metal oxide media can reach a point where it is fully saturated with the contaminant species and it can therefore no longer function to remove additional amounts of the contaminant species from a mixed chemical composition. As described herein, a fatty acid alkyl ester composition at an elevated temperature can be used in order to remove bound contaminants, such as bound fatty acids, from metal oxide media thereby regenerating it for further use. For example, in an embodiment, the invention includes a method for removing organic acids from a crude product mixture including contacting the crude product mixture with a metal oxide substrate, wherein free organic acids in the crude product mixture bind to the metal oxide substrate, thereby removing free organic acids and forming a refined product mixture; separating the refined product mixture from the metal oxide substrate; and removing the organic acids bound to the metal oxide substrate by contacting the metal oxide substrate with an alkyl ester composition at a temperature of greater than about 100 degrees Celsius.

Metal oxides media used with embodiments of the invention can include metal oxides with surfaces including Lewis acid sites, Bronsted base sites, and Bronsted acid sites. By definition, a Lewis acid is an electron pair acceptor. A Bronsted base is a proton acceptor and a Bronsted acid is a proton donor. Metal oxides of the invention can specifically include zirconia, alumina, titania and hafnia. Metal oxides of the invention can specifically include oxides of Group IV metals. Metal oxides of the invention can also include silica clad with a metal oxide selected from the group consisting of zirconia, alumina, titania, hafnia, zinc oxide, copper oxide, magnesium oxide and iron oxide. In some embodiments, metal oxides of the invention can include mixtures of metal oxides, such as mixtures of zirconia, alumina, titania and/or hafnia. In other embodiments, the metal oxides used can be substantially pure metal oxides, such as substantially pure zirconia, alumina, titania and/or hafnia. Of the various metal oxides that can be used with embodiments of the invention, zirconia, titania and hafnia are advantageous as they are very chemically and thermally stable and can withstand very high temperatures and pressures as well as extremes in pH.

Metal oxides of the invention can include metal oxide particles clad with carbon. Carbon clad metal oxide particles can be made using various techniques such as the procedures described in U.S. Pat. Nos. 5,108,597; 5,254,262; 5,346,619; 5,271,833; and 5,182,016, the contents of which are herein incorporated by reference. Carbon cladding on metal oxide particles can render the surface of the particles more hydrophobic.

Metal oxide media of the invention can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. No. 4,138,336 and U.S. Pat. No. 5,108,597, the content of both of which are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the content of which is herein incorporated by reference.

Metal oxide media used in embodiments of the invention can be sintered by heating them in a furnace or other heating device at a relatively high temperature. In some embodiments, the metal oxide is sintered at a temperature of 160° C. or greater. In some embodiments, the metal oxide is sintered at a temperature of 400° C. or greater. In some embodiments, the metal oxide is sintered at a temperature of 600° C. or greater. Sintering can be done for various amounts of time depending on the desired effect. Sintering can make metal oxide media more durable. In some embodiments, the metal oxide is sintered for more than about 30 minutes. In some embodiments, the metal oxide is sintered for more than about 3 hours. However, sintering also reduces the surface area. In some embodiments, the metal oxide is sintered for less than about 1 week.

In some embodiments, the metal oxide media is in the form of particles. Particles within a desired size range can be specifically selected for use in embodiments herein. For example, particles can be sorted by size such as by air classification, elutriation, settling fractionation, or mechanical screening. In some embodiments, the size of the particles is greater than about 0.2 μm. In some embodiments, the size range selected is from about 0.2 μm to about 2 mm. In some embodiments, the size range selected is from about 1 μm to about 100 μm. In some embodiments, the size range selected is from about 5 μm to about 15 μm. In some embodiments, the size range selected is about 10 μm. In some embodiments, the size range selected is about 5 μm.

It can be desirable to maximize the surface area of the metal oxide media so that the amount of organic acids bound by the media is maximized. As such, in some embodiments, metal oxide media used with embodiments of the invention includes porous particles. By way of example, in some embodiments the metal oxide particles can have an average pore size of about 30 angstroms to about 2000 angstroms. However, in other embodiments, the metal oxide particles used are non-porous.

The Lewis acid sites on metal oxides of the invention can interact with Lewis basic compounds. Thus, Lewis basic compounds can be bonded to the surface of metal oxides of the invention. A Lewis base is an electron pair donor. Lewis basic compounds of the invention can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, methanethiol, chromic acid, permanganic acid, phytic acid and ethylenediamine tetramethyl phosphonic acid (EDTPA). Lewis basic compounds of the invention can also include hydroxide ion as formed from the dissociation of bases such as sodium hydroxide, potassium hydroxide, lithium hydroxide and the like.

The anion of an acid can be bonded to a metal oxide of the invention by refluxing the metal oxide in an acid solution. By way of example, metal oxide particles can be refluxed in a solution of sulfuric acid. Alternatively, the anion formed from dissociation of a base, such as the hydroxide ion formed from dissociation of sodium hydroxide, can be bonded to a metal oxide by refluxing in a base solution. By way of example, metal oxide particles can be refluxed in a solution of sodium hydroxide. The base or acid modification can be achieved under exposure to the acid or base in either batch or continuous flow conditions when disposed in a reactor housing at elevated temperature and pressure to speed up the adsorption/modification process. In some embodiments, fluoride ion, such as formed by the dissociation of sodium fluoride, can be bonded to the particles.

While not intending to be bound by theory, it is believed that the ability of metal oxides to remove contaminants is related to Lewis acid sites on the metal oxide binding with contaminants that have Lewis basic characteristics. As such, in some embodiments contaminants removed by systems herein include compounds with Lewis basic characteristics. While not limiting the scope herein, exemplary contaminants can include carboxylic acids, phosphates, sulfates, phenols, and the like. By way of further example, the contaminants can include those compounds with stronger Lewis base characteristics than the desired compounds in the composition that is being purified. Biodiesel fuel typically includes esters as desired compounds. As such, in some embodiments contaminants removed from a fuel composition can include all compounds having stronger Lewis base characteristics than the esters in the fuel composition. Organic acids removed with methods and devices of the invention can specifically include carboxylic acids. Organic acids removed with methods and devices of the invention can specifically include free fatty acids.

In some embodiments, at least some water is included in the composition to be purified because organic acids become strong Lewis bases when they are able to ionize, which is facilitated by the presence of water. In some embodiments, the water is already present in the composition to be purified. In other embodiments, some water may be added to the composition to be purified. In still other embodiments, sufficient water may already be present on the metal oxide.

In some embodiments, metal oxide particles can be packed into a housing, such as a column or bed. Disposing metal oxide particles in a housing is one approach to facilitating continuous flow processes. Many different techniques may be used for packing the metal oxide particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the metal oxide particles of the invention can be impregnated into a membrane, such as a PTFE membrane.

In some embodiments, metal oxide media used with embodiments of the invention is not in particulate form. For example, a layer of a metal oxide can be disposed on a substrate in order to form media used with embodiments of the invention. The substrate can be a surface that is configured to contact the unrefined chemical composition during processing. In one approach, metal oxide media can be disposed as a layer over a surface of a housing that contacts the unrefined chemical composition. Alternatively, the metal oxide media can be embedded as a particulate in the surface of an element that is configured to contact the unrefined chemical composition during processing.

In various embodiments, the metal oxide media can be regenerated after it has reached saturation. For example, in some embodiments, the metal oxide media can be contacted with a fatty acid alkyl ester composition at a temperature high enough to cause the bound contaminant, such as bound fatty acids, to release off of the metal oxide media and into the fatty acid alkyl ester composition. It is believed that the temperature of the fatty acid alkyl ester composition impacts the degree to which the contaminant releases off of the metal oxide media. In some embodiments, the fatty acid alkyl ester composition used to regenerate the metal oxide media is greater than about 50 degrees Celsius. In some embodiments, the fatty acid alkyl ester composition used to regenerate the metal oxide media is greater than about 100 degrees Celsius.

Referring now to FIG. 1, an embodiment of an organic acid removal device 100 is shown in accordance with an embodiment of the invention. The organic acid removal device 100 includes a housing 104 defining an interior volume. Metal oxide media can be disposed within the interior volume of the housing 104. In some embodiments, metal oxide media can be tightly packed within the interior volume of the housing 104. A crude product mixture (such as a crude vegetable oil or fatty acid methyl ester composition) containing free organic acids can be pumped into the housing 104 through a first conduit 102. After contacting the metal oxide media, free fatty acids in the crude product mixture become bound to the metal oxide media. The now refined product mixture then passes out of the housing 104 through a second conduit 106.

Figure 2:
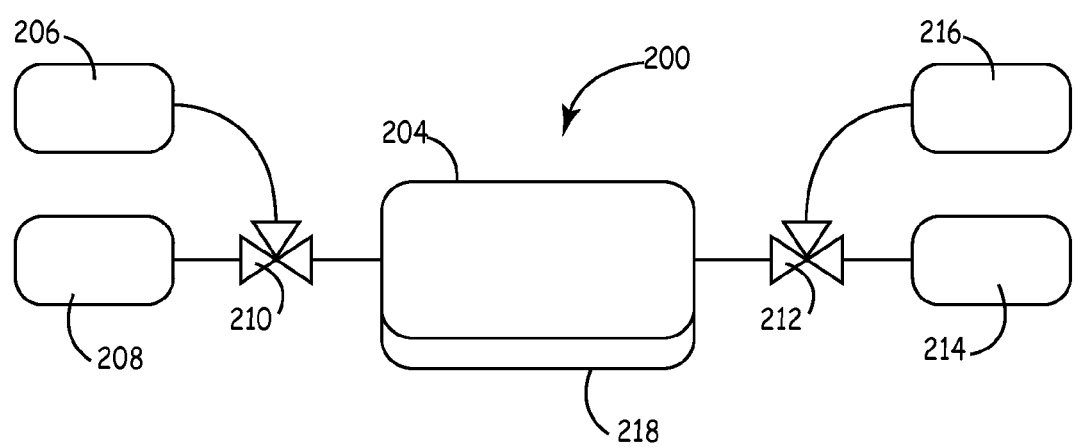
FIG. 2 is a block diagram of a contaminant removal device in accordance with another embodiment of the invention.

As free organic acids are bound to the metal oxide media, the media can become saturated. As such, some embodiments of the invention include components and methods for regeneration of the metal oxide media. Referring now to FIG. 2, a block diagram of an organic acid removal device 200 is shown in accordance with another embodiment of the invention. A crude product mixture is pumped from a crude product reservoir 208. The crude product mixture passes through a control valve 210 before passing into a housing 204 that holds metal oxide media. After contacting the metal oxide media, free fatty acids in the crude product mixture are bound to the metal oxide media. The now refined product mixture then passes out of the housing 204 though a second control valve 212 and into a refined product reservoir 214.

When the metal oxide media becomes saturated, control valve 210 can be actuated to take the crude product reservoir 208 off-line and put a fatty acid alkyl ester supply tank 206 on-line. The fatty acid alkyl ester composition can be pumped from the fatty acid alkyl ester supply tank 206, through the control valve 210 and into the housing 204. Simultaneously, the housing 204 can be heated with a heating element 218, to maintaining the temperature of the fatty acid alkyl ester composition inside the housing 204 at a desired set point. In some embodiments, the fatty acid alkyl ester composition can be preheated. The bound contaminants, such as bound fatty acids, then release from the metal oxide media and go into solution with heated fatty acid alkyl ester composition, thereby returning the metal oxide media to a state where more free fatty acids can be bound. Control valve 212 can be actuated so that the effluent fatty acid alkyl ester composition now carrying fatty acids from the metal oxide media can pass through control valve 212 before being collected in a tank 216. After the metal oxide media is regenerated, then both of the control valves 210, 212 can be actuated so that a crude product mixture can once again flow into the housing 204 for removal of free fatty acids.

In some embodiments, the crude product mixture to be refined can itself be a fatty acid alkyl ester composition. As such, in some embodiments, the system can be configured to either remove contaminants or regenerate the metal oxide media based on the temperature of the composition contacting the metal oxide media. At relatively low temperatures the free fatty acids in a fatty acid alkyl ester composition will bind to metal oxide media whereas at relatively high temperatures fatty acids bound to metal oxide media will release into a fatty acid alkyl ester composition.

Figure 3:
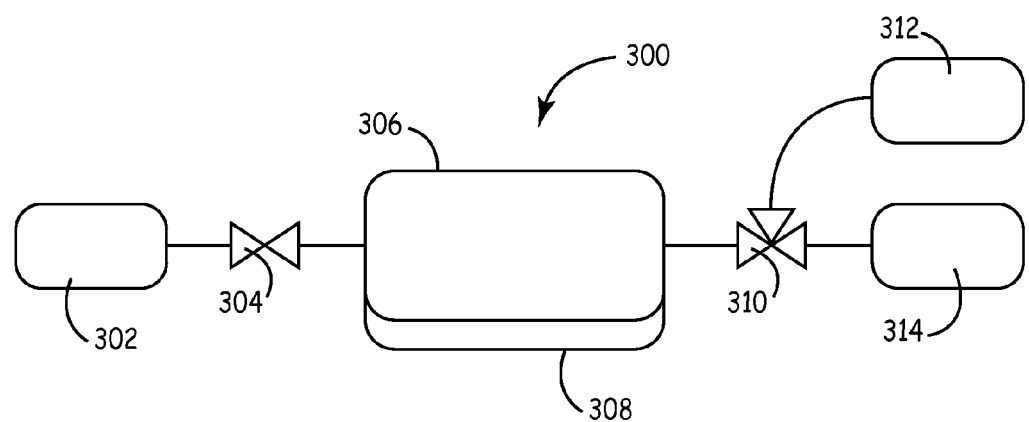
FIG. 3 is a block diagram of a contaminant removal device in accordance with another embodiment of the invention.

Referring now to FIG. 3, a block diagram of an organic acid removal device 300 is shown in accordance with another embodiment of the invention. A fatty acid alkyl ester composition to be refined is pumped from a crude product reservoir 302. The crude product mixture passes through a control valve 304 before passing into a housing 306 that holds metal oxide media. After contacting the metal oxide media, free fatty acids in the crude product mixture are bound to the metal oxide media. The now refined product mixture then passes out of the housing 306 though a second control valve 310 and into a refined product reservoir 314.

When the metal oxide media becomes saturated, the housing 306 can be heated with a heating element 308, thereby setting the temperature of the fatty acid alkyl ester composition inside the housing 306 at a desired set point. For example, in some embodiments the housing 306 can be heated so that the temperature of the fatty acid alkyl ester mixture is at least about 100 degrees Celsius. The bound contaminants, such as bound fatty acids, then release from the metal oxide media and go into solution with the heated fatty acid alkyl ester composition, thereby returning the metal oxide media to a state where more free fatty acids can be bound. At the same time, control valve 310 can be actuated so that the effluent fatty acid alkyl ester composition now carrying fatty acids from the metal oxide media can pass through control valve 310 before being collected in a tank 312.

After the metal oxide media is regenerated, then the control valve 310 can be actuated so that a crude product mixture can once again flow into the housing 306 for removal of free fatty acids.

Various techniques can be used to determine when the metal oxide media is saturated and, therefore, when it is time to regenerate the same. In some embodiments, this can be accomplished though a calculation of the binding capacity of the metal oxide media used and the concentration of organic acids in the crude product mixture. Hypothetically, if it is known that a gram of the metal oxide can bind the amount of organic acids contained in one liter of a particular crude product mixture, then, at maximum, a liter of the crude product mixture can be run through an organic acid removal device for every gram of metal oxide media in the device, before the metal oxide media is saturated.

In some embodiments, a sensor can be used in order to determine the concentration of organic acids in the refined composition after contacting the metal oxide media. If the concentration of organic acids is observed to rise, then this can be taken as an indication that the metal oxide media being used has become saturated. Various types of sensors can be used to detect or estimate concentrations of organic acids. By way of example, various chromatographic techniques can be used to assess organic acid concentrations. In another embodiment, a pH sensor can be used. In general, a refined product mixture will exhibit a pH that is more alkaline than an otherwise identical product mixture having a greater concentration of organic acids. As such, changes in the pH of the product mixture coming out of the housing containing the metal oxide media can be used to indicate when the metal oxide media has become saturated. An exemplary pH sensor is described in U.S. Pat. No. 4,582,589, the content of which is herein incorporated by reference. However, it will be appreciated that many other types of pH sensors and analyzers (HPLC, GC, IR, NMR, MS) can be used. The analyzer can either be installed online or employed offline for FFA determination of the system effluent.

It will be appreciated that the percentage of organic acids removed by the metal oxide media will depend on various factors including the residence time of the crude product mixture within the housing, the temperature of the crude product mixture, and the binding capacity of the metal oxide media. However, it will be appreciated that by adjusting parameters associated with the process, the amount of free organic acids removed from the crude product mixture can be controlled. In some embodiments, at least about 50% of the free organic acids in a crude product mixture are removed after refining the same with a free organic acid removal device as described herein. In some embodiments, at least about 90% of the free organic acids in a crude product mixture are removed after refining the same with a free organic acid removal device as described herein. In some embodiments, at least about 99% of the free organic acids in a crude product mixture are removed after refining the same with a free organic acid removal device as described herein.

In some embodiments, the reaction mixture reaches the desired level of completion after one pass over a metal oxide media bed or packing. However, in other embodiments, the effluent flow may be rerouted over the same metal oxide media or routed over another metal oxide media bed or packing so that a larger percentage of free organic acids are removed.

In some embodiments, two different metal oxides (such as zirconia and titania) can be separately formed but then disposed together within a single housing. In such an approach, the crude product mixture passing over metal oxide media can be simultaneously exposed to both metal oxides.

In some embodiments, devices for removal of contaminants as described herein can be used in conjunction with equipment for producing oil products. For example in some embodiments, devices or systems for removal of contaminants as included herein can be coupled with a biodiesel production plant. Exemplary methods and systems of producing biodiesel fuel that can be used as part of various embodiments herein are described in U.S. patent application Ser. No. 11/833,839, the content of which is herein incorporated by reference in its entirety.

In some embodiments, devices or systems for removal of contaminants can be used in conjunction with equipment such as mechanical presses, solvent extraction tanks, evaporators, and the like. For example, in a process for producing a refined oil product from a raw material various preparative steps can occur first including cleaning, drying and, in the case of a plant produce with hulls, dehulling. After the raw material is prepared, it can optionally be heated in order to coagulate proteins to make the oil extraction process easier.

In the solvent extraction process, the raw material can be cut into flakes which are put in percolation extractors and immersed in a solvent, such as hexane. The crude oil is solvated by the solvent and then separated from the flakes. The solvent is then separated from the crude oil, such as with an evaporator. The crude oil can then be passed through a device for the removal of organic acids as described herein.

In the mechanical pressing process, the raw material is typically crushed and then pressed in a mechanical press to yield a crude oil. The crude oil can then be passed through a device for the removal of organic acids as described herein.

In some embodiments, other purification steps can also be taken including degumming (removing of phosphatides) and bleaching (with activated earth or activated carbon to remove color and other impurities).

Crude Product Mixtures (Feed Stocks)

Devices and methods of the invention can be used as part of the process of producing and/or refining various types of organic acid containing plant, animal, and microbe feed stocks. By way of example, devices and methods of the invention can be used in the process of producing and/or refining rapeseed oil, soybean oil, canola oil, cottonseed oil, grape seed oil, mustard seed oil, corn oil, linseed oil, safflower oil, sunflower oil, poppy-seed oil, pecan oil, walnut oil, oat oil, peanut oil, rice oil, rice bran oil, *camellia* oil, castor oil, olive oil, palm oil, coconut oil, rice oil, algae oil, seaweed oil, tall oil, and Chinese Tallow tree oil. Crude product mixtures processed with embodiments of the invention can also include components of argan, avocado, babassu palm, balanites, borneo tallow nut, brazil nut, *calendula, camelina, caryocar,* cashew nut, chinese vegetable tallow, cocoa, coffee, cohune palm, coriander, cucurbitaceae, *euphorbia,* hemp, illipe, *jatropha,* jojoba, kenaf, kusum, *macadamia* nuts, mango seed, noog abyssinia, nutmeg, opium poppy, *perilla,* pili nut, pumpkin seed, rice bran, sacha inche, seje, sesame, shea nut, switch grass, teased, *allanblackia,* almond, chaulmoogra, *cuphea, jatropa curgas,* karanja seed, *lesquerella,* neem, papaya, tonka bean, tung, ucuuba, cajuput, *clausena anisata,* davana, galbanum natural oleoresin, german chamomile, *hexastylis,* high-geraniol monarda, juniapahinojo sabalero, lupine, *melissa officinalis,* milfoil, ninde, patchouli, tarragon, and wormwood.

Many different crude product mixtures derived from animals can be processed with embodiments of the invention. By way of example, animal-based crude product mixtures can include choice white grease, lard (pork fat), tallow (beef fat or chicken fat), fish oil, and poultry fat. Many different crude product mixtures derived from microorganisms (Eukaryotes, Bacteria and Archaea) can be processed with embodiments of the invention. By way of example, microbe-based crude product mixtures can include the L-glycerol lipids of Archaea and algae and diatom oils.

In some embodiments, crude product mixtures used herein can be derived from both plant and animal sources. Crude product mixtures can include yellow grease, white grease, brown grease, black oil, soapstock, acidulated soapstock, and acidulated oil. By way of example, yellow, white or brown grease can include frying oils from deep fryers and can thus include fats of both plant and animal origin. Crude product mixtures can specifically include used cooking oil. Brown grease (also known as trap grease) can include fats extracted from sewage systems and can thus include fats of both plant and animal origin.

It will be appreciated that devices and methods herein can also be used to process and/or refine (or "polish") fuel compositions, such as fatty acid methyl ester compositions. For example, in some embodiments, devices and methods herein can be used to polish biodiesel compositions.

The present invention may be better understood with reference to the following examples. These examples are intended to be representative of specific embodiments of the invention, and are not intended as limiting the scope of the invention.

EXAMPLES

Example 1

Formation of Zirconia Particles

A colloidal dispersion of zirconium oxide (NYACOL™ ZR100/20) (Nyacol Nano Technologies, Inc., Ashland, Mass.), containing 20 wt. % $ZrO_2$ primarily at about 100 nm particles was spray dried. As the dispersion dried, the particles interacted strongly with one another to provide aggregated $ZrO_2$ particles. The dried aggregated particles that were obtained were examined under an optical microscope and observed to consist mostly of spherules from about 0.5 μm to about 15 μm in diameter.

The dried spherules were then sintered by heating them in a furnace at a temperature of 750° C. for 6 hours. The spherules were air classified, and the fraction having a size of approximately 10 μm was subsequently isolated. The particles were all washed in sodium hydroxide (1.0 M), followed by water, nitric acid (1.0 M), water and then dried under vacuum at 110° C. BET nitrogen porosimetry was performed in order to further characterize the sintered spherules. The physical characteristics of the spherules were as listed below in Table 2.

TABLE 2

| | |
|---|---|
| Surface area (m$^2$/g) | 22.1 |
| Pore volume (mL/g) | 0.13 |
| Pore diameter (angstrom) | 240 |
| Internal Porosity | 0.44 |
| Average size (micron) | 10.23 |
| Size Standard Deviation (μm) | 2.62 |
| D90/D10 (Size Distribution) | 1.82 |

Example 2

Formation of Base/Acid Modified Zirconia Particles 1000 g of zirconia particles, prepared according to Example 1, were put into a polyethylene bottle. 1.5 liters of deionized water was put into it and shaken strongly. Half of the suspension was put into a 4000 ml glass Erlenmeyer flask, 2000 ml of deionized water was added into it and the mixture was sonicated under vacuum for 30 minutes to get the water into the pores of the particles. The suspension was then put into 20 L bucket. The same procedure was repeated on the other half of the suspension. The particles were transferred to a plastic container. The particles were rinsed with a carbonate free 0.5 M NaOH solution. Then the suspension was stirred for 8 hours.

The NaOH solution was then decanted and then the particles were rinsed twice with carbonate free purified water (2 L in total). The water was then removed. 0.5 M HNO$_3$ was added to the particles at a ratio of 10:1 (v/m). The suspension was then shaken for 8 hours.

The nitric acid solution was then removed. The particles were then rinsed three times with deionized water 3-4 times until reaching a pH=5-6. The particles were filtered and then rinsed with ethanol. The particles were placed in a clean container and dried under vacuum at 120° C. for 5 hours.

Example 3

Adsorption of Fatty Acids in Biodiesel Using Base/Acid Modified Zirconia 10 g, 5 g, 2.5 g, and 1.0 g samples of base/acid modified zirconia (zirconium dioxide) particles as formed in Example 2 were added to 50 mL centrifuge tubes, respectively. 10 g of a biodiesel composition, known to contain 4% fatty acids, were put into each tube. The tubes were shaken to suspend the particles, sonicated for 10 minutes, and then put under vacuum for 5 minutes each. The samples were held at room temperature for 10 minutes. Finally, the samples were centrifuged at 3750 rpm for 5 minutes. An acid titration was then performed on 5 g of each treated sample according to ASTM Method D664-04.

Figure 4:
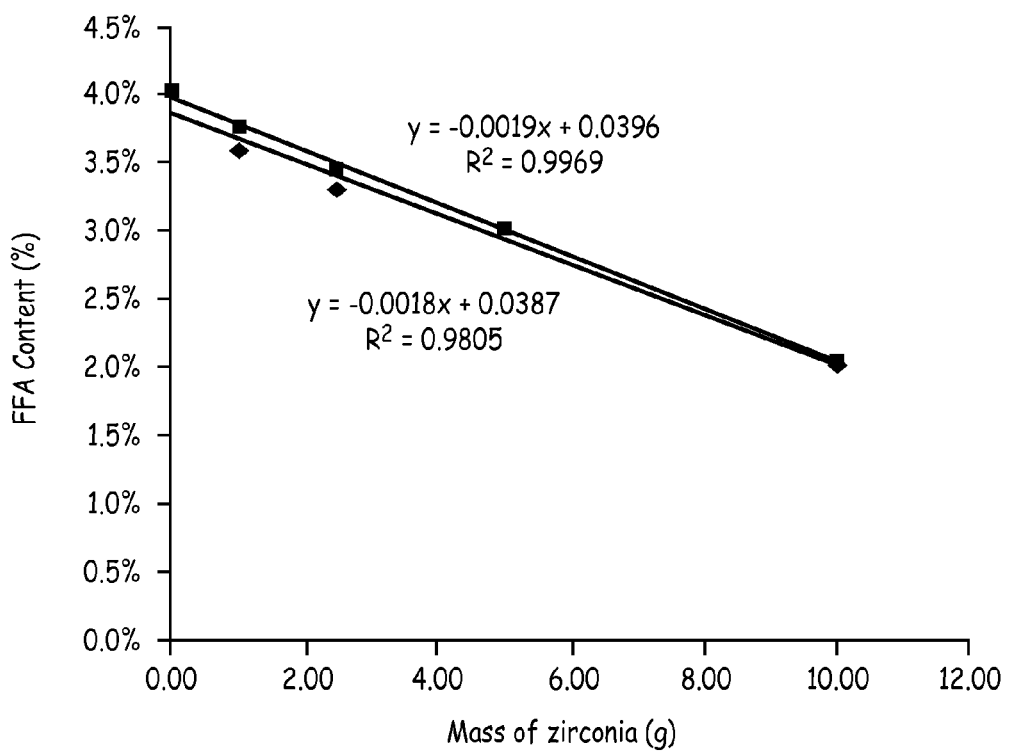
FIG. 4 is a graph of free fatty acid concentrations in samples after processing with varying amounts of metal oxide media.

The above experimental procedure was then duplicated. The results of both trials are shown in FIG. 4. As FIG. 4 shows, the reproducibility between the two trials was very good. The average binding capacity of fatty acids on zirconia was 12.6 mg/g, which is equivalent to 1.76 micromol/m$^2$.

Example 4

Formation of Base Modified Zirconia Particles 1 liter of 2.0 M sodium hydroxide was placed in a 2 liter plastic Erlenmeyer flask. 110 g of 5-15 diameter μm bare zirconia, prepared as described in Example 1, was put into the flask. The particle suspension was sonicated for 10 minutes under vacuum and then swirled for 2 hours at ambient temperature. The particles were then allowed to settle and the base solution was decanted. Then, 1.4 liters of HPLC-grade water was added to the flask followed by settling decanting. Then, 200 mL of HPLC-grade water was added back to the flask and the particles were collected on a nylon filter with 0.45 micron pores. The collected particles were then washed with 2 aliquots of 200 mL HPLC-grade water followed by 3 aliquots of 200 mL of HPLC-grade methanol. Air was then passed through the particles until they were free-flowing.

Example 5

Adsorption of Fatty Acids in Biodiesel Using Base Modified Zirconia 10 g of base modified zirconia (zirconium dioxide) particles as formed in Example 4 was added to 50 mL centrifuge tube. 10 g of a biodiesel composition, known to contain 4% fatty acids, was put into the tube. The tube was shaken to suspend the particles, sonicated for 10 minutes, and then put under vacuum for 5 minutes. The sample was held at room temperature for 10 minutes. Finally, the sample was centrifuged at 3750 rpm for 5 minutes. An acid titration was then performed on 5 g of the sample according to ASTM Method D664-04.

The results show that the average binding capacity of fatty acids on zirconia is 13.2 mg/g, which is close to results obtained on base modified zirconia.

Example 6

Figure 5:
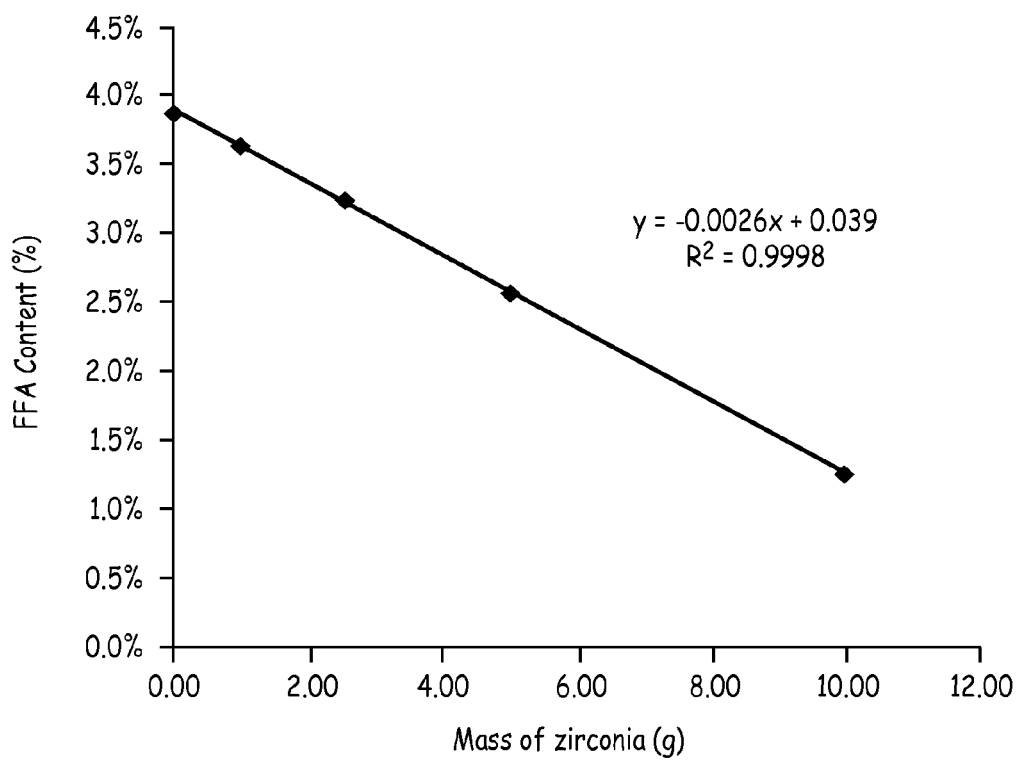
FIG. 5 is a graph of free fatty acid concentrations in samples after processing with varying amounts of metal oxide media.

Adsorption of Fatty Acids in Biodiesel Using Unmodified Titania 10 g, 5 g, 2.5 g, and 1.0 g samples of unmodified titania particles (20 μm diameter/100 Å average pore size, ZirChrom Separations, Inc, Anoka, Minn.) were added to 50 mL centrifuge tubes, respectively. 10 g of a biodiesel composition, known to contain 4% fatty acids, were put into each tube. The tubes were shaken to suspend the particles, sonicated for 10 minutes, and then put under vacuum for 5 minutes each. The samples were held at room temperature for 10 minutes. Finally, the samples were centrifuged at 3750 rpm for 5 minutes. An acid titration was then performed on 5 g of each treated sample based on ASTM methods. The adsorption results are shown in FIG. 5. The average binding capacity of fatty acids on unmodified titania was calculated to be 11.7 mg/g.

Example 7

Heat Treatment of Fatty Acid Saturated Zirconia Particles

The fatty acid saturated zirconia particles from Example 3 were collected by filtration with a 0.45 μm membrane. The particles were washed with 3×150 mL hexane to remove the residual biodiesel composition. The particles were then dried under vacuum.

The dried particles were then heated to 845° F. in the presence of oxygen for four hours to combust the fatty acids on the zirconia surface. Then the regenerated particles were cooled down to room temperature.

Example 8

Figure 6:
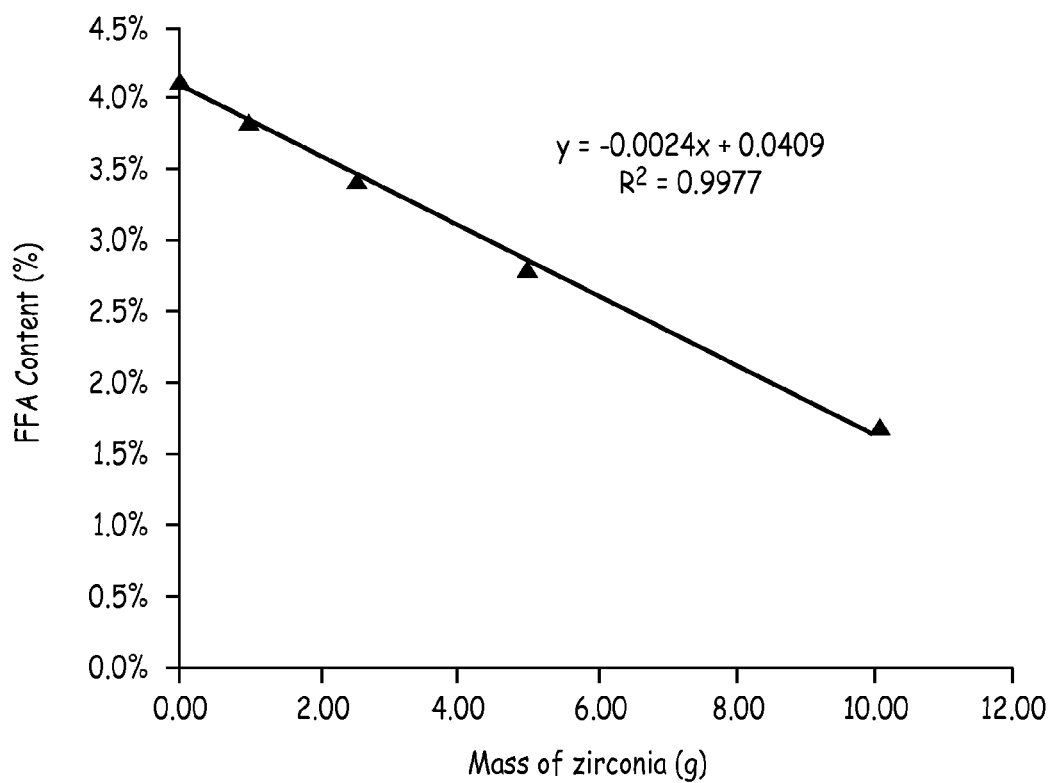
FIG. 6 is a graph of free fatty acid concentrations in samples after processing with varying amounts of metal oxide media.

Adsorption of Fatty Acids in Biodiesel by Using Regenerated Zirconia Particles 10 g, 5 g, 2.5 g, and 1.0 g samples of regenerated zirconia particles as formed in Example 7 were added to 50 mL centrifuge tubes, respectively. 10 g of a biodiesel composition, known to contain 4.1% fatty acids, were put into each tube. The tubes were shaken to suspend the particles, sonicated for 10 minutes, and then put under vacuum for 5 minutes each. The samples were held at room temperature for 10 minutes. Finally, the samples were centrifuged at 3750 rpm for 5 minutes. An acid titration was then performed on 5 g of each treated sample according to ASTM method D664-04. The adsorption results are shown in FIG. 6. The average binding capacity of fatty acids on regenerated zirconia was calculated to be 13.2 mg/g, which is very close to the binding capacity value (12.6 mg/g) obtained in example 3. The data suggest that saturated metal oxide particles can be completely regenerated by heat-treatment.

Example 9

Figure 7:
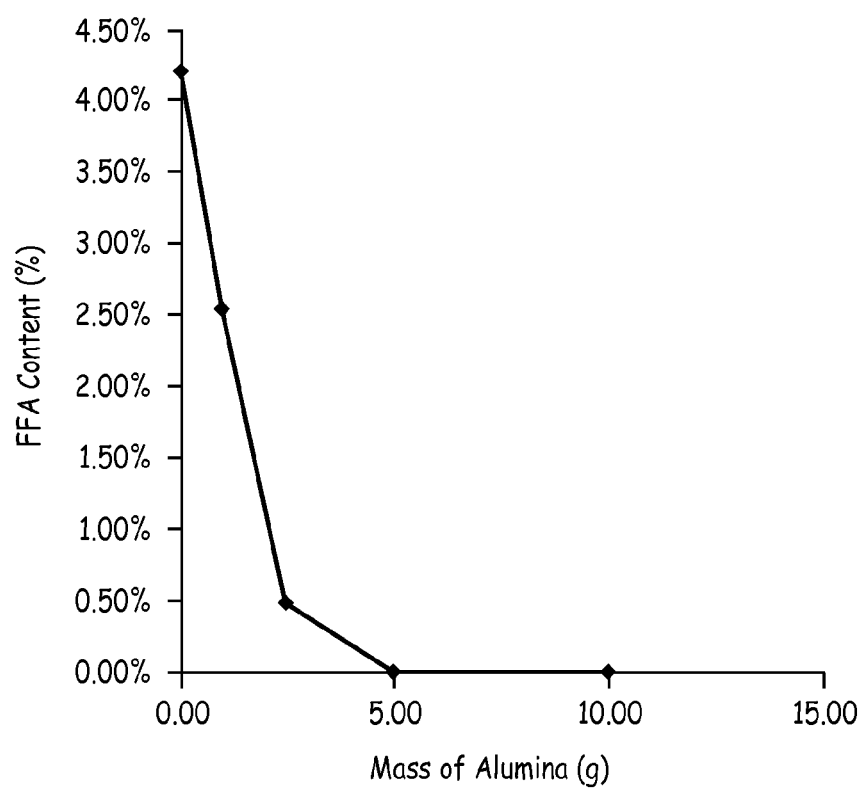
FIG. 7 is a graph of free fatty acid concentrations in samples after processing with varying amounts of metal oxide media.

Adsorption of Fatty Acids in Biodiesel Using Basic Alumina 10 g, 5 g, 2.5 g, and 1.0 g samples of unmodified basic alumina particles (150 mesh diameter/58 Å average pore size, surface area 155 $m^2$/g, pH 9.5±0.5 in $H_2O$, Sigma-Aldrich, St. Louis, Mo.) were added to 50 mL centrifuge tubes, respectively. 10 g of a biodiesel composition, known to contain 4.2% fatty acids, was put into each centrifuge tube. The tubes were shaken to suspend the particles, sonicated for 10 minutes, and then put under vacuum for 5 minutes each. The samples were held at room temperature for 10 minutes. Finally, the samples were centrifuged at 3750 rpm for 5 minutes. An acid titration was then performed on 5 g of each treated sample based on ASTM methods (ASTM METHOD D664-04). The adsorption results are shown in FIG. 7. The average static binding capacity of fatty acids on basic alumina was calculated to be about 158.9 mg/g.

Example 10

Figure 8:
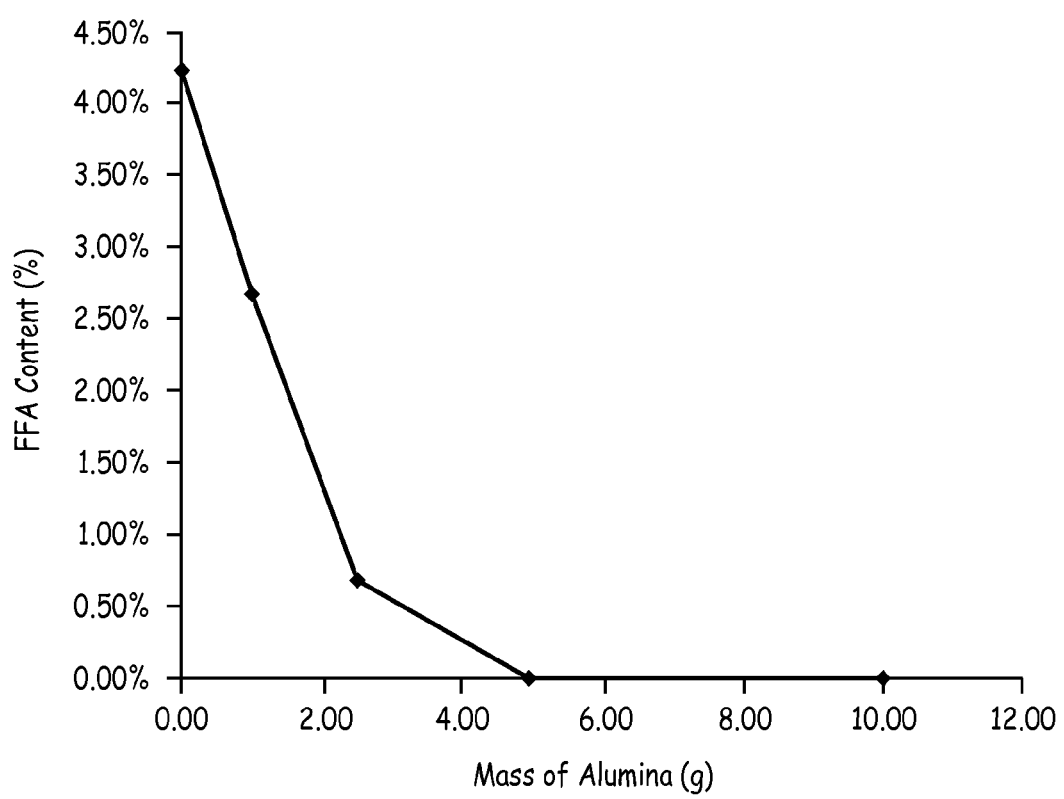
FIG. 8 is a graph of free fatty acid concentrations in samples after processing with varying amounts of metal oxide media.

Adsorption of Fatty Acids in Biodiesel Using Neutral Alumina 10 g, 5 g, 2.5 g, and 1.0 g samples of unmodified neutral alumina particles (150 mesh diameter/58 Å average pore size, 155 $m^2$/g surface area, pH 7.0±0.5 in $H_2O$, Sigma-Aldrich, St. Louis, Mo.) were added to 50 mL centrifuge tubes, respectively. 10 g of a biodiesel composition, known to contain 4.2% fatty acids, were put into each tube. The tubes were shaken to suspend the particles, sonicated for 10 minutes, and then put under vacuum for 5 minutes each. The samples were held at room temperature for 10 minutes. Finally, the samples were centrifuged at 3750 rpm for 5 minutes. An acid titration was then performed on 5 g of each treated sample based on ASTM methods (ASTM METHOD D664-04). The adsorption results are shown in FIG. 8. The average static binding capacity of fatty acids on neutral alumina was calculated to be about 149.2 mg/g.

Example 11

Figure 9:
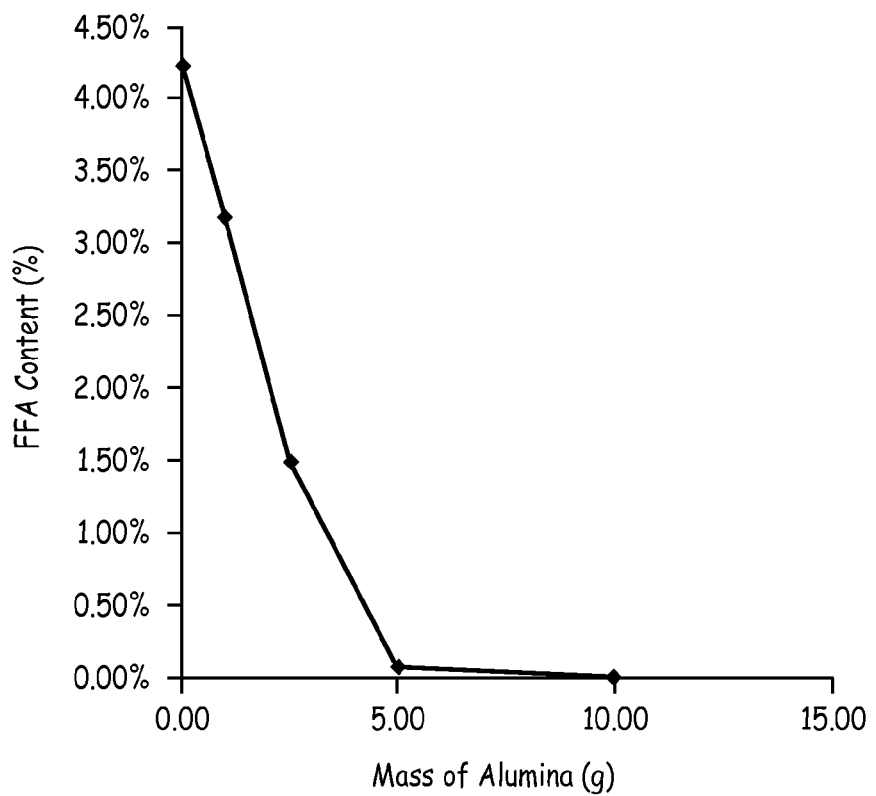
FIG. 9 is a graph of free fatty acid concentrations in samples after processing with varying amounts of metal oxide media.
Figure 10:
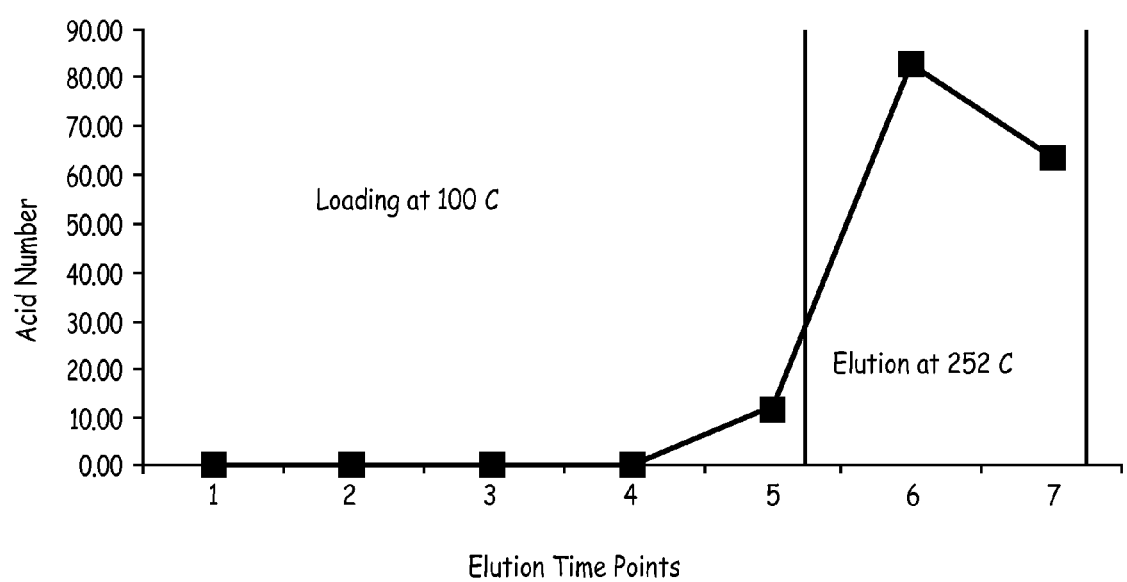
FIG. 10 is a graph of the acid number of samples of a composition eluting off of a column at various time points as described in example 11 herein.

Adsorption of Fatty Acids in Biodiesel Using Acidic Alumina 10 g, 5 g, 2.5 g, and 1.0 g samples of unmodified acidic alumina particles (150 mesh diameter/58 Å average pore size, 155 $m^2$/g surface area, pH 4.5±0.5 in $H_2O$, Sigma-Aldrich, St. Louis, Mo.) were added to 50 mL centrifuge tubes, respectively. 10 g of a biodiesel composition, known to contain 4.2% fatty acids, were put into each tube. The tubes were shaken to suspend the particles, sonicated for 10 minutes, and then put under vacuum for 5 minutes each. The samples were held at room temperature for 10 minutes. Finally, the samples were centrifuged at 3,750 rpm for 5 minutes. An acid titration was then performed on 5 g of each treated sample based on ASTM methods (ASTM METHOD D664-04). The adsorption results are shown in FIG. 9. The average static binding capacity of fatty acids on acidic alumina was calculated to be about 107.1 mg/g.

Example 11

Adsorption of Fatty Acids in Biodiesel Using Acidic Alumina

A column (50 cm length×21.2 mm I.D.) was dry packed with 150 mesh/58 A alumina particles. This column was then used to first adsorb free fatty acids from a fatty acid alkyl ester composition and then later release bound fatty acids into an alkyl ester composition according to the following procedure.

The column containing alumina media was initially flushed with methanol. Then a total of 471 ml of a fatty acid alkyl ester composition, known to contain free fatty acids, was injected into the column at a rate of 15 ml/min. The system was kept under approximately 2000 PSI of pressure during the trial. A heater was used to control the temperature of the column. For a first series of time points, the set point for the heater was 101 degrees Celsius. Then for a final two time points, the set point of the heater was increased to 245 degrees Celsius and then 252 degrees Celsius. Samples of the composition eluting off of the column were taken at each time point and the acid number was empirically determined. The data is shown in Table 3 below. For the last two time points the outlet temperature of the column was measured at several different times in order to capture the change in temperature corresponding to the increased set points of the heater.

TABLE 3

| Time Point | Elapsed Time (min) | Collection Time (min) | Acid Numbers | Heater Set Point ° C. | Outlet Temperature ° C. of Column |
|---|---|---|---|---|---|
| 1 | 7 | 7 | 0.00 | 101 | 59 |
| 2 | 14 | 7 | 0.00 | 101 | 50 |
| 3 | 21 | 7 | 0.00 | 101 | 56 |
| 4 | 28 | 7 | 0.06 | 101 | 57 |
| 5 | 35 | 7 | 11.29 | 101 | 56 |
| 6 | 42 | 13 | 82.67 | 245 | 60-63-73 |
| 7 | 55 | 25 | 63.32 | 252 | 73-96-117 |

This example establishes that at relatively low temperatures free fatty acids can be removed from a product mixture by adsorption to metal oxide media. This example further establishes that these same fatty acids can be removed from metal oxide media by exposure to a stream of fatty acid alkyl esters at a relatively higher temperature.

The invention has been described with reference to various specific and preferred embodiments and techniques. However, it should be understood that many variations and modifications may be made while remaining within the spirit and scope of the invention.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, device, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention claimed is:

1. A method for removing organic acids from a crude product mixture comprising:
   contacting the crude product mixture with a metal oxide substrate, wherein free organic acids in the crude product mixture bind to the metal oxide substrate, thereby removing free organic acids and forming a refined product mixture;
   separating the refined product mixture from the metal oxide substrate;
   removing the organic acids bound to the metal oxide substrate by contacting the metal oxide substrate with fatty acid alkyl ester composition at a temperature of greater than about 100 degrees Celsius.

2. The method of claim 1, comprising removing the organic acids bound to the metal oxide substrate by contacting the metal oxide substrate with an alkyl ester composition at a temperature of greater than about 150 degrees Celsius.

3. The method of claim 1, the metal oxide substrate comprising Lewis acid sites and Lewis base sites sufficient to bond with free organic acids.

4. The method of claim 1, the metal oxide substrate comprising Bronsted base sites sufficient to bond with free organic acids.

5. The method of claim 1, the metal oxide substrate comprising Bronsted acid sites sufficient to bond with free organic acids.

6. The method of claim 1, the crude product mixture comprising fatty acid alkyl ester composition.

7. The method of claim 1, the crude product mixture comprising an organic acid containing material selected from the group consisting of rapeseed oil, soybean oil, canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, camellia oil, castor oil, and olive oil, palm oil, coconut oil, rice oil, algae oil, seaweed oil, and Chinese Tallow tree oil.

8. The method of claim 1, wherein at least about 95% of the free organic acids in the crude product mixture bind to the metal oxide substrate.

9. The method of claim 1, the metal oxide comprising a porous metal oxide.

10. The method of claim 1, wherein the metal oxide is selected from the group consisting of zirconia, alumina, hafnia and titania.

11. The method of claim 10, the metal oxide comprising zirconia.

12. The method of claim 1, the metal oxide substrate comprising a particulate metal oxide, the particulate metal oxide comprising an average particle size of about 0.2 microns to about 1 millimeter.

13. The method of claim 1, the metal oxide substrate disposed within a housing, the operation of contacting the crude product mixture with a metal oxide substrate comprising pumping the crude product mixture into the housing.

14. The method of claim 1, wherein the step of contacting the crude product mixture with a metal oxide substrate is performed at a temperature less than about 100 degrees Celsius.

15. A method of regenerating a free fatty acid removal apparatus comprising
   contacting saturated metal oxides disposed within the free fatty acid removal apparatus with a fatty acid alkyl ester composition at a temperature of greater than about 100 degrees Celsius, thereby releasing bound fatty acids from saturated metal oxides into the fatty acid alkyl ester composition.

16. The method of claim 15, contacting saturated metal oxides disposed within the free fatty acid removal apparatus with a fatty acid alkyl ester composition at a temperature of greater than about 150 degrees Celsius.

17. The method of claim 1, further comprising heating the metal oxide media up from a lower temperature to a temperature of greater than about 100 degrees Celsius after the step of separating the refined product mixture from the metal oxide substrate.

* * * * *